July 17, 1951 E. I. ANDERSON 2,561,088

COMBINED AMPLITUDE AND FREQUENCY MODULATION DETECTORS

Filed May 17, 1946 3 Sheets-Sheet 1

INVENTOR
EARL I. ANDERSON.
BY H.S. Grover
ATTORNEY

July 17, 1951 E. I. ANDERSON 2,561,088
COMBINED AMPLITUDE AND FREQUENCY MODULATION DETECTORS
Filed May 17, 1946 3 Sheets-Sheet 2

INVENTOR
EARL I. ANDERSON.
BY H.S. Grover
ATTORNEY

COMBINED AMPLITUDE AND FREQUENCY MODULATION DETECTORS

Filed May 17, 1946 3 Sheets-Sheet 3

INVENTOR
EARL I. ANDERSON.
BY H. S. Grover
ATTORNEY

Patented July 17, 1951

2,561,088

UNITED STATES PATENT OFFICE 2,561,088

COMBINED AMPLITUDE AND FREQUENCY MODULATION DETECTORS

Earl I. Anderson, Manhasset, N. Y., assignor to Radio Corporation of America, a corporation of Delaware Application May 17, 1946, Serial No. 670,386

3 Claims. (Cl. 250—27)

My present invention relates to detectors of frequency modulated (FM) or amplitude (AM) carrier waves, and more particularly to novel combined AM-FM detectors.

In his application Serial No. 614,956, filed September 7, 1945, now U. S. Patent No. 2,497,841, issued February 14, 1950, Stuart W. Seeley has disclosed and claimed a novel detector of angle modulated carrier waves which is insensitive to amplitude variations of the waves. The detector produces output only in the presence of a variation in the ratio of signals, such as frequency modulation (FM) signals, applied to a pair of rectifiers having but a single direct current path connecting them in series-aiding polarity. Such a "ratio" detector produces modulation signal output in response to variation in the ratio of the FM signal strength at the respective rectifiers, while the common direct current path referred to above carries substantially all the unidirectional current which flows through either rectifier. Various proposals have been made in the past for selectively detecting FM or AM signals in a common demodulating system. However, such prior combined FM-AM detector systems are not applicable to the Seeley FM ratio detector circuit.

It is, therefore, an important object of my present invention to provide a combined FM-AM receiver employing a ratio detector of the type disclosed in the aforesaid Seeley application; at least one of the rectifiers of the ratio detector being adapted for detection of AM signals.

It is a further object of my invention to provide an FM detector of the aforesaid Seeley type, wherein existing circuit components of the detector are readily utilized to provide detection of AM carrier waves of a different frequency than waves in the FM range.

Still other objects of my invention are generally to improve FM-AM receivers, and more especially to provide economical combined FM-AM detector circuits.

Still other objects of my invention will best be understood by reference to the following description, taken in connection with the drawing, in which I have indicated diagrammatically several circuit organizations whereby my invention may be carried into effect.

Figure 1:
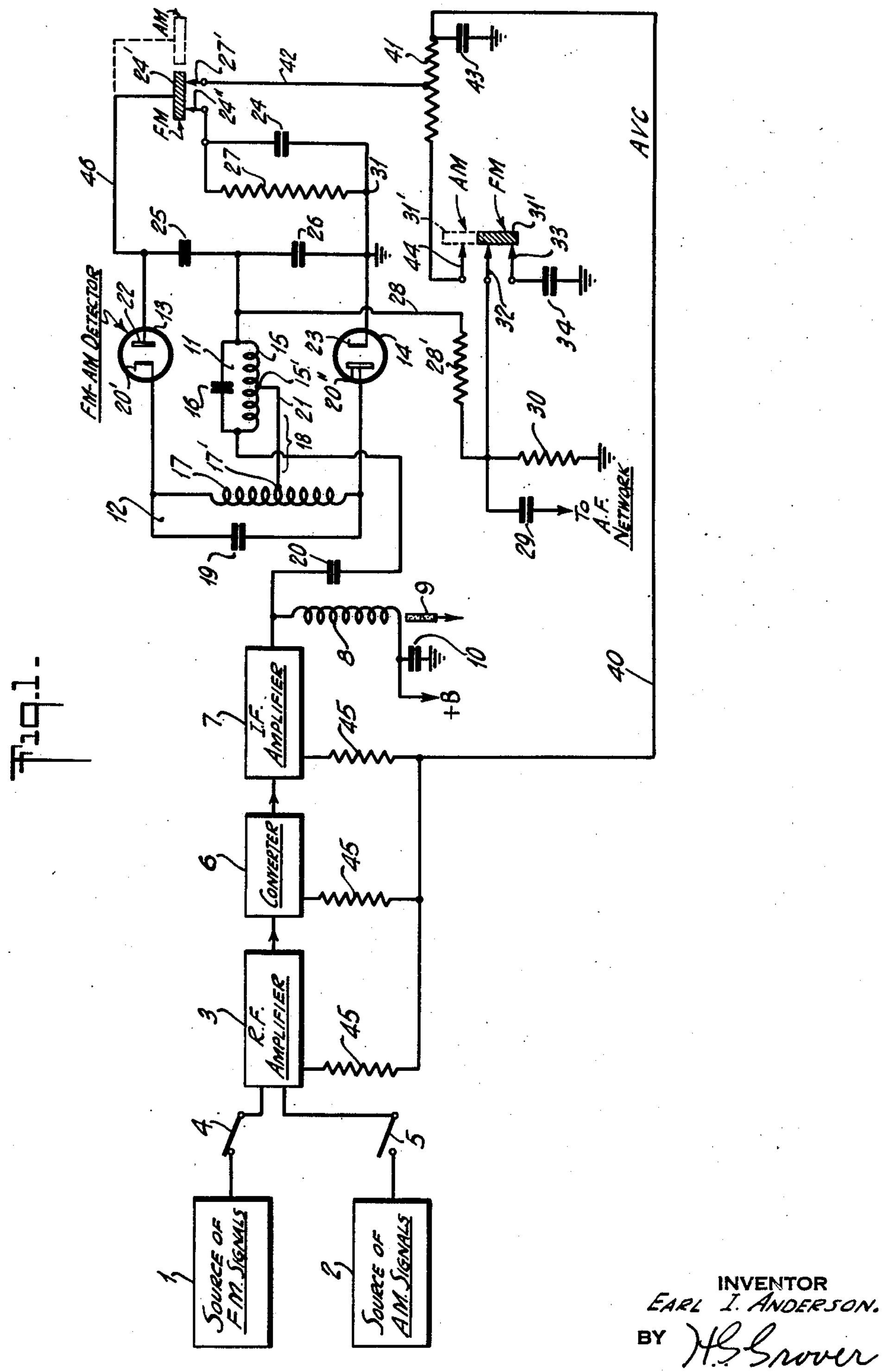
Fig. 1 shows, in partially schematic form, an FM-AM receiver system embodying one form of the invention.

Referring now to the accompanying drawings, wherein like reference characters in the different figures designate similar circuit elements, Fig. 1 shows an illustrative receiving system embodying a demodulator network adapted to provide audio voltage and automatic volume control (AVC) voltage in response either to FM or AM signal reception. The receiver circuits prior to the demodulator network are schematically represented. Those skilled in the art of radio reception are well acquainted with the nature of the circuits customarily employed in multi-band receivers. While my invention is readily adapted for FM and AM signal reception on respective bands of 88 to 108 megacycles (mc.) and 550 to 1700 kilocycles (kc.), it is to be clearly understood that the invention is not limited to such frequency bands. The 88 to 108 mc. band is given by way of illustration, since it is the FM broadcast band now assigned to such transmission. The invention is applicable to the 42–50 mc. band, so far as FM reception is concerned. The 550 to 1700 kc. band is the present AM broadcast band assigned to transmission of AM signals.

It will further be understood that in the following description and claims the generic expression "angle modulated" is intended to include frequency modulation, phase modulation or hybrid modulations thereof having characteristics common to both FM and phase modulation. From a very general viewpoint my invention relates to a demodulator network having separate input circuits for carrier waves of different frequencies and of different modulation characteristics.

The numerals 1 and 2 in Fig. 1 denote respectively different sources of modulated carrier waves. Source 1 may be the usual signal wave collector, such as a dipole, employed for collecting FM signal waves. The FM signal waves are transmitted from FM transmitters at a mean or carrier frequency assigned to the particular transmitter. In the assumed FM band of 88 to 108 mc. the radiated carrier wave frequency would be selected from that range, and would be transmitted as a wave of variable frequency and substantially uniform amplitude. As is well known, the frequency modulation of the carrier wave would be in accordance with the modulation (such as audio) frequency signals at the transmitter. The extent of frequency deviation of the carrier frequency is a function of the modulation signal amplitude, while the rate of frequency deviation is dependent upon the modulation signal frequencies per se. The present permissible extreme frequency deviation in the FM band of 88 to 108 mc. is 75 kc. to either side of the carrier frequency, while the allotted FM channels are 200 kc. wide. These values are purely illustrative.

Source 2 may be the customary grounded antenna circuit employed in AM broadcast reception. The allotted AM broadcast channels are 10 kc. wide in this band. In AM broadcast transmission the carrier wave is modulated in amplitude in accordance with the modulation, or audio, frequency signals. The carrier frequency is maintained constant in value at the transmitter. The numeral 3 designates a tunable radio frequency amplifier having suitable signal selector circuits for FM or AM reception.

Switching devices 4 and 5 respectively provide separate connection of the sources 1 and 2 to respective selector circuits of amplifier 3. It will be understood that when switch 4 is in closed position, collected FM signal energy will be applied to the selector circuits of amplifier 3. Such selector circuits are not shown, but it will be understood that they are capable of selectively amplifying the FM signals over a band at least 150 kc. wide. Upon closing of switch 5 and opening switch 4, the same amplifier 3 will have the FM selector circuits operatively replaced by AM selector circuits. These latter circuits will select the collected AM signals and permit amplifier 3 to amplify the same over a 10 kc. band. Multiband selector circuits and switching devices for suitable change-over are well known to those skilled in the art of radio communication. It is to be understood that the switching devices 4 and 5 affect the detector network only in so far as they determine the character of the modulated wave which is delivered to the demodulator input circuit.

Assuming that the system is of the superheterodyne type, as is the usual practice at present, the converter 6 and intermediate frequency (I. F.) amplifier 7 will also be provided with suitable FM and AM signal selector circuits. At the converter 6 the FM signals will have the mean or center frequency reduced to a value which may be chosen from a range of 1 to 20 mc., as for example, 10.7 mc. The AM signals are reduced to an I. F. value of 456 kc., as an illustrative frequency value, the latter being a commonly employed frequency in AM broadcast receivers of the superheterodyne type. The I. F. amplifier 7, which may consist of one or more separate stages of amplification, will have an ultimate output circuit across which is developed the amplified FM signals or AM signals at the respective I. F. values. The coil 8, which is of the variable inductance type, is to be understood as being arranged in series in the plate circuit of the last I. F. amplifier tube. Hence, the lower end of coil 8 is shown connected to a point +B of a suitable direct current voltage source. The numeral 9 designates an iron core, or slug, which is utilized to vary, or adjust, the inductance of coil 8 to a suitable desired value. The condenser 10 bypasses the lower end of coil 8 to ground for I. F. currents.

There are to be developed across the coil 8 the FM signals at the 10.7 mc. mean frequency when switch 4 is closed, and all FM selector circuits of amplifier 3, converter 6 and I. F. amplifier 7 are in suitable operative electrical connection. Conversely, when switch 5 is closed and switch 4 is open, and all AM selector circuits are in operative electrical connection, there will be developed across coil 8 AM signals at the I. F. value of 456 kc. In accordance with one aspect of my present invention existing circuit elements or components of the demodulator network cooperate with coil 8 to provide selective detection of either the FM signals or the AM signals, and, in addition, provide automatic volume control (AVC) voltage during the detection of either form of received signals.

The demodulator network itself comprises but two electron discharge devices, shown as diodes by way of illustration. The electrodes of the pair of diodes may be housed within a common tube envelope, or they may be located in separate envelopes. The FM detector circuit is substantially that disclosed and claimed in the aforesaid Seeley application. Accordingly, reference is made to the Seeley application for a detailed explanation of the construction and functioning of an FM ratio detector circuit of the type shown in Fig. 1. It will be observed that the present receiving system, as explained in the Seeley application, dispenses with an amplitude limiter prior to the input section (or FM translating network) of the detector.

One of the reasons in the past for employing an amplitude limiter prior to the in section of the FM demodulator to reduce undesired AM effects on the carrier wave, was to avoid the necessity for critical tuning to the exact center, or carrier, frequency of a desired FM wave. As explained in the aforesaid Seeley application, there need be no special amplitude limiter stage employed prior to the detector circuit, since the detector itself is substantially immune to amplitude variations of the received FM signals. Hence, the I. F. amplifier immediately preceding the detector circuit may possess normal and full gain, which is the reverse of the usual operating condition for an amplitude limiter.

The input network of the FM detector comprises coupled primary and secondary circuits denoted by numerals 11 and 12 respectively. The input coil 8 is indicated as a part of the primary circuit. While any known and suitable discriminator circuit may be utilized to provide the energizing signal voltages for diode rectifiers 13 and 14, I prefer to explain the present circuit action on the basis of the discriminator circuit of Fig. 1. The discriminator network is generally of the type shown and claimed in U. S. Patent No. 2,121,103, granted to S. W. Seeley on June 21, 1938. In general, it is desired to employ a network constructed and arranged to derive from angle modulated waves a pair of voltages whose relative amplitudes vary in accordance with the angular deviations of the waves with respect to a predetermined reference condition (whether phase or frequency).

Considering the specific illustrative embodiment of Fig. 1, and assuming that the receiver is adjusted for FM signal reception, coil 15 is shunted by condenser 16 to provide a parallel resonant circuit tuned to the operating I. F. value of 10.7 mc. Condenser 16 need not be a physical capacitor as such, but may be the sum of the capacitances appearing across coils 8 and 15.

The secondary coil 17 is coupled to primary coil 15 as indicated by numeral 18, and coil 17 is shunted by condenser 19. The resonant secondary circuit 12, including coil 17 and condenser 19, is tuned to substantially the resonant frequency of the primary circuit 11. Each of coils 15 and 17 may be of the known inductance trimmer type, or capacity tuning may be used. Specifically, iron cores or slugs may be used for adjusting the inductance values of the respective coils 15 and 17, if coil 17 is so arranged that varying the slug does not unbalance the two halves of the coil. The high alternating potential side of coil 15 is connected by a condenser 20 to the high potential side of coil 8. Lead 21 connecting the midpoint 17' of coil 17 to the intermediate tap 15' of coil 15 establishes the mid point 17' and intermediate tap 15' at a common potential. Tapping down on coil 15 provides improved impedance matching and greater sensitivity for the ratio detector. In addition, the proper ratio of primary to secondary voltage may be obtained which improved the linearity.

Rectifiers 13 and 14 may have their electrodes embodied in a common tube envelope, as in the 6H6 type tube. The cathode 20' of diode 13 is connected to the upper terminal, as diagrammatically shown, of condenser 19 and to the upper end of coil 17, whereas the anode 20 of diode 14 is connected to the lower terminal of condenser 19 and to the lower end of coil 17. The anode 22 of diode 13 and the cathode 23 of diode 14 are directly connected together through condenser 24 when the metallic armature 24' is in the "FM" position for making the electrical connection to the contact point 24''. The cathode 23 and the corresponding terminal of condenser 24 are established at ground potential for direct current. The magnitude of condenser 24 is chosen so that the anode 22 of diode 13 is at ground potential with respect to modulation frequencies i. e., audio frequency as well as for I. F. Grounding this point 31 provides a negative voltage at the anode 22 of diode 13 which is utilized for automatic volume control.

The anode 22 of diode 13 is, in addition, connected to grounded cathode 23 by a pair of series-arranged condensers 25 and 26. Each of these condensers 25 and 26 has a relatively low impedance to I. F. currents, and they function as I. F. bypass condensers. The primary coil 15 has its right hand end or terminal connected to the junction of condensers 25 and 26. Hence, the right hand terminal of coil 15 is at ground potential for I. F. currents, since condenser 26 connects that point to ground. The coil 8 functions as a radio frequency choke, since it feeds +B voltage to the I. F. amplifier plate. Since condensers 20 and 26 are of low impedance, their reactance is effectively in shunt with the reactance of inductance 15 and capacitor 16.

It can be seen that the diodes 13 and 14 are arranged in reversed relation relative to the connection in a conventional FM detector circuit of the type employing balanced diodes. The detector circuit is completed by a resistor 27 which is shunted by the condenser 24. It is again emphasized that the switch armature 24' is in electrical connection with the contacts 24'' and 27', the so-called "FM" position.

The modulation voltage, in this case the desired audio frequency signal voltage, is taken off by connecting lead 28 to the low I. F. potential end of primary coil 15 i. e., the junction of condensers 25 and 26. Condenser 29 is an audio frequency coupling condenser, and is inserted in the lead 28, which includes the resistor 28', to the input grid of the following audio amplifier tube (not shown). The junction of condenser 29 and resistor 28' is connected to ground through resistor 30, and the second FM switch armature 31' is assumed to be connected to the contact 32 (which is connected to the ungrounded end of resistor 30) and to the contact 33 which is connected to ground through condenser 34. Resistor 28' and condenser 34 provide a de-emphasis time constant to compensate the pre-emphasis applied at the transmitter.

The AVC path from the detector circuit includes the connection 40 whose input end is connected to the contact 27' by means of the tapped resistor 41 and lead 42. The right hand end of resistor 41 is connected to ground through the condenser 43, while the left hand end of resistor 41 is connected to contact 44. The AVC lead 40 is connected through the usual filter resistors 45 to the respective controlled signal grids of the amplifier 3, converter 6 and I. F. amplifier 7. Those skilled in the art of radio communication are fully acquainted with the specific details for connecting the AVC circuit into the various networks whose gains are to be controlled in response to the AVC voltage derived from the detector circuit.

The switch armature 24', which is permanently connected by lead 46 to the anode 22, is adjusted into "AM" receiving position by disconnecting the armature 24' entirely from the contacts 24'' and 27'. I have shown the AM position in dotted lines. The switch armature 31' is adjusted to AM position when it is shifted into electrical connection with contacts 32 and 44. Here, again, the dotted line representation on contacts 32 and 44 designates this "AM" position of armature 31'. It will be noted that in the AM position of armature 31' the contact 33 remains free, while the AVC lead 40 is connected in circuit with diode 14. On the other hand, when armature 24' is shifted to its AM position, the diode 13 is out of electrical circuit with the output connections of the detector network.

In order to explain the operation of the receiving system shown in Fig. 1, let it first be assumed that the armatures 24' and 37' are in their FM positions as shown in Fig. 1. In this connection of the detector network, it being assumed that the preceding circuits of the receiving system have all been conditioned to receive FM signals, the detector circuit functions substantially as described by S. W. Seeley in his aforesaid application Serial No. 614,956. It is not believed necessary to explain the operation of the FM detector circuit operation in detail, since such operation has been described with considerable detail and explanation in the aforesaid Seeley application.

It is believed sufficient for the purposes of the present application to point out that due to the coupling 18 between tuned circuits 11 and 12 there will be a 90° phase shift between the primary and secondary voltages when the instantaneous carrier frequency (10.7 mc.) is at the resonant or center frequency value. Accordingly, the secondary signal voltage at circuit 12 will be applied to cathode 20' and anode 20 from the respective ends of coil 17 in opposite phase, but in each case in phase quadrature with the primary signal voltage. Of course, it is assumed that the FM signals across coil 8 are instantaneously at the mean or carrier frequency of 10.7 mc. It follows, therefore, that the resultant signal voltages applied to cathode 20' and anode 20 will be equal at the carrier frequency, and the rectified voltages will be of equal magnitude.

If at some later instant the FM signals have a frequency different from the resonant frequency of circuit 12, there will occur a phase shift of the signal energy transmitted through the transformer 15, 17 which is greater or less than 90°, depending upon the direction and the extent of frequency difference between the instantaneous frequency of the FM signals and the predetermined resonant frequency of the tuned circuits 11 and 12. This means that there will be applied to the diodes 13 and 14 resultant signal voltages of different magnitudes. Therefore, the rectified voltages will be of different magnitudes.

As pointed out in the aforesaid Seeley application, if for some reason the magnitude of applied I. F. signals suddenly drops to zero the FM detector circuit tends to maintain the same output potential that was assumed before the signal was removed, and it does this rather than return to the zero or average potential as it does in the conventional and know limiter-discriminator combination. It will be noted that the FM detector circuit has but a single direct current path connecting the diode rectifiers in series-aiding polarity. The condenser 24 shunted across resistor 27 acts to inhibit changes in the voltage drop across resistor 27 at a modulation frequency rate. The underlying or basic mode of "ratio detection" may be stated in these simple terms: The direct current potential across two diodes 13 and 14 in series, each passing the same direct current, will be directly proportional to the I. F. energy applied to those two diodes substantially regardless of the magnitude of that direct current.

The audio frequency signals, corresponding to the modulation applied to the FM carrier at the transmitter, are taken off from the junction of condenser 25 and 26 through lead 28, resistor 28' and condenser 29. The AVC connection is made to the anode 22 through the path including resistor 41, lead 42, contact 27', armature 24' and lead 46. It has been pointed out in the aforesaid Seeley application that grounding the anode 22 of diode 13 for modulation frequencies i. e., audio frequency as well as I. F., provides a negative voltage at the anode 22 which may be used for automatic gain control.

As explained heretofore, the cost of a combined AM-FM receiver will be substantially reduced if one or both of the diodes 13, 14 used in the FM ratio detector circuit can, also, be used as the rectifier for AM detection. As explained heretofore, the FM detector circuit is very simply converted to an AM detector circuit by merely shifting the switch armatures 24' and 31' to the dotted line positions "AM."

In accordance with my invention, the coil 8 is chosen in magnitude so as to resonate at the I. F. value in AM reception, which is 456 kc., with the capacities of condensers 20 and 26 in series. The coil 8 is provided with the iron slug 9 so as to adjust its inductance. When the armature 31' is in the "FM" position, it connects the deemphasis network 34, 28' in circuit with the lead 28 connected to the junction of condensers 25 and 26. The lead 42 is connected to an intermediate point or tap on resistor 41, because it is sometimes desirable further to filter the AVC voltage provided across resistor 27 during FM reception, but it probably is not desirable to add the full effect of resistor 41 and condenser 43 for this purpose.

Figure 2:
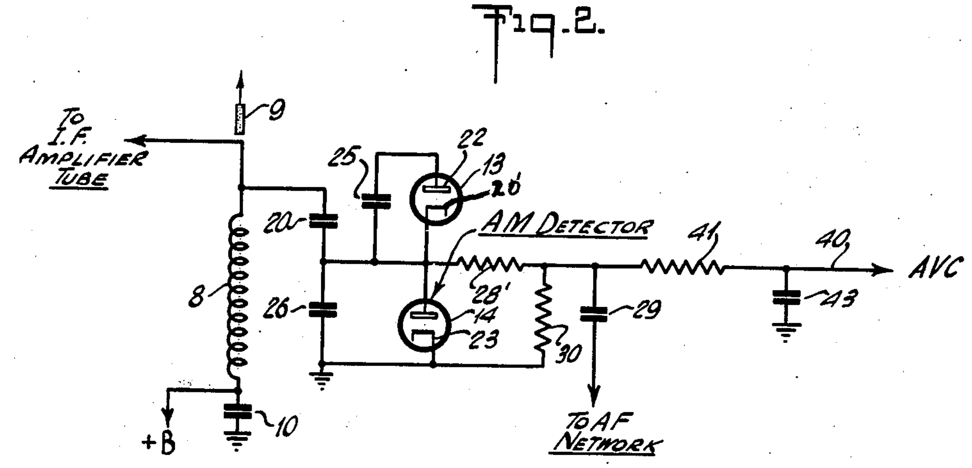
Fig. 2 shows the equivalent circuit diagram of the AM detector circuit in Fig. 1.

Assuming now that the armatures 24' and 31' have been shifted to their respective "AM" positions, and the preceding circuits of the receiving system have been conditioned for AM signal reception, the resulting AM detector circuit is as depicted in Fig. 2, which has been redrawn as the equivalent AM detector circuit. In other words, in Fig. 2 there have been eliminated those circuit components which are effectively out of circuit at the relatively low I. F. frequency used in AM reception. These components are principally the inductances 17 and 15 and their respective tuning capacitors 19 and 16. The diode rectifier 14 is the actual AM signal rectifier, and diode 13 and condenser 25 play no part in the AM detection. However, the diode 13 and condenser 25 cannot be disconnected without switching "hot" radio frequency circuits. However, these two elements will not affect the operation of the resulting AM detector circuit. Accordingly, it will be noted that the effective AM detector circuit consists of the coil 8 shunted by condensers 20 and 26 in series, the diode 14 having its anode 20 connected to the junction of condensers 20 and 26, while the cathode 23 of diode 14 is grounded.

The diode 14 is shunted by resistors 28' and 30 in series, condenser 29 transmitting the audio frequency voltage from the junction of resistors 28' and 30. The AVC lead 40 is now connected through resistor 41 to the junction of resistors 28' and 30, while the filter condenser 43 connects the right hand end of resistor 41 to ground. It will be noted that the network 41, 43 serves to remove the audio frequency component existing across resistor 30 when the direct current voltage component is employed for AVC bias during AM reception. The voltage applied to diode rectifier 14 is less than the voltage appearing across coil 8. The actual fraction of the voltage appearing across coil 8 which is applied to rectifier 14 for AM detection is determined by the ratio of the reactance of condenser 26 to the sum of the reactances of condensers 20 and 26. The reactance of condenser 20 may be made small compared to the reactance of condenser 26, and in this case the voltage loss is small. It should be noted that during AM detection condensers 20 and 26 are connected in series across coil 8, and effectively tune coil 8 to the operating I. F. value of 456 kc. During FM signal reception the condenser 25 is effectively in parallel with condenser 26, thereby changing the apparent capacity across coil 8 at the I. F. value of 456 kc. (AM reception). This detunes the AM detection circuit when receiving in the FM band so that their is less likelihood of FM signal energy coming through at the AM frequency and causing difficulty.

It will now be appreciated that I have utilized the existing circuit components of the Seeley FM ratio detector circuit for AM signal detection. By adjusting a pair of switches in the detector circuit certain of the circuit components are effectively removed from the circuit, while the coil 8 coacts with the existing condensers 20 and 26 and diode rectifier 14 to provide a simple AM detector circuit. As pointed out previously, lead 21 from mid-point 17' on coil 17 connects to an intermediate tap on coil 15, rather than to the high potential side of primary circuit 11. This is done in order to improve the gain of the detection system, and, also, to secure a more efficient coupling between the high impedance driver circuit and the relatively low impedance input circuit of the diodes 13 and 14.

In the modification of my invention shown in

Figure 3:
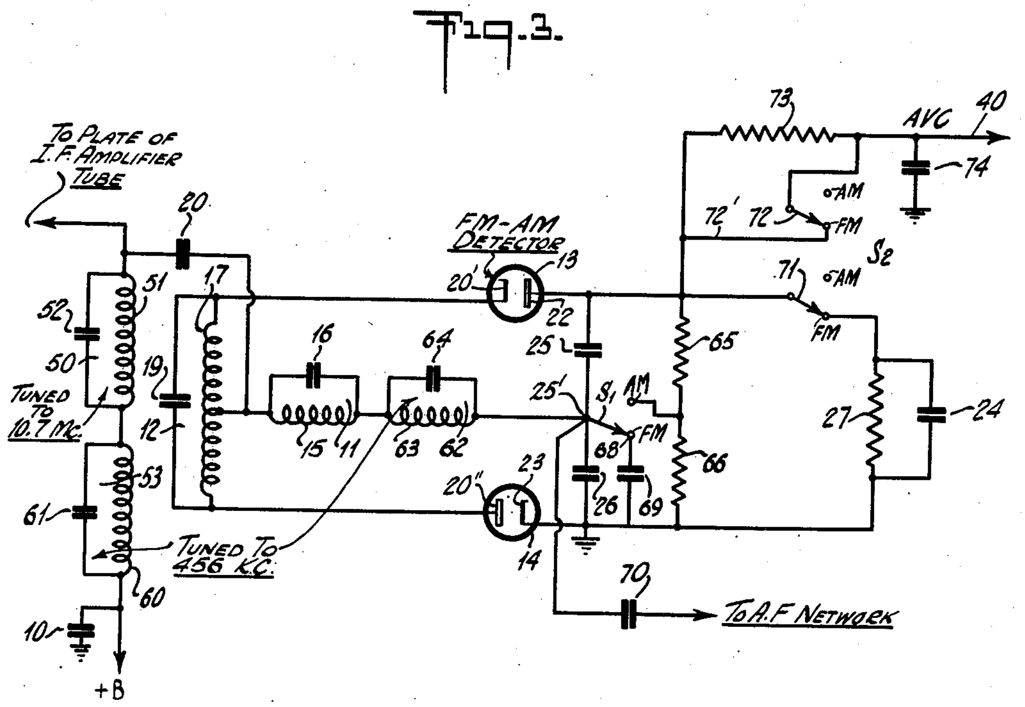
Fig. 3 is a circuit diagram of a modified embodiment of the FM-AM detector circuit.

Fig. 3 I have shown a different form of coupling circuit between the plate of the driver I. F. amplifiers tube (not shown) and the primary circuit 11. In place of the coil 8 of Fig. 1, there is employed a parallel resonant circuit 50 consisting of coil 51 and shunt condenser 52. The circuit 50 is tuned to 10.7 mc., the operating I. F. value at FM reception. In this modification there is secured voltage doubling for AVC. Further, three tuned circuits (50, 11, 12) are provided thereby producing additional selectivity over the circuit of Fig. 1. The condenser 20 couples the high alternating potential side of resonant circuit 50 to the midpoint of coil 17 and to the high potential side of primary circuit 11. The coils 15, 17 and 51, therefore, are each tuned to the operating I. F. value at FM reception. The condenser 20 is a small capacitor whose value is equal to $$K\sqrt{C_{52}C_{16}}$$

The capacitor 20 can be replaced by mutual inductance coupling between coils 51 and 15. The use of tuned impedance in the plate circuit of the driver tube (I. F. amplifier) provides more efficient coupling and higher gain.

To provide AM detection upon adjustment of suitable switches, I insert circuit 53 in series with circuit 50. The circuit 53 consists of coil 60 and parallel condenser 61 tuned to the operating I. F. value (456 kc.) for AM reception. In series with primary circuit 11 there is connected a resonant circuit 62 tuned to 456 kc. Circuit 62 consists of coil 63 in series with coil 15, while condenser 64 shunts coil 63 to tune it to the 456 kc. frequency. If the magnitudes of condensers are so chosen that $$\sqrt{C_{61}C_{64}}=\frac{C_{20}}{K}$$

then condenser 20 will provide the proper coupling in both the AM and FM bands. If mutual coupling is provided between coils 15 and 51, then separate coupling must be provided between coils 60 and 63.

The remainder of the changes necssary in the circuit of Fig. 3 follow. Th series-connected condensers 25 and 26 are shunted by series-related resistors 65 and 66, whose junction is connected to a contact 67 (AM contact). The switch arm $S_1$ is connected to the junction of condensers 25 and 26, while contact 68 (FM contact) is connected to ground by a de-emphasis condenser 69. The audio voltage, whether appearing as AM or FM on the received carrier, is taken off from junction point 25' by the condenser 70. Resistors 65 and 66 are roughly the same as resistor 30 in Fig. 1.

Switch $S_2$ is provided by a pair of spaced contact arms 71 and 72. Contact arm 71 is connected to the anode end of resistor 65, while contact arm 72 is connected to the same point through the AVC filter resistor 73. The FM contact of arm 71 returns to ground through resistor 27 shunted by condenser 24. The FM contact of arm 72 is connected by lead 72' to resistor 65. The AVC line includes the alternating voltage filter resistor 73 and condenser 74, and is to be connected, as shown in Fig. 1, to the controlled amplifier stages. In Fig. 3 the switches $S_1$ and $S_2$ are shown adjusted for FM signal reception. Resistances 65 and 66 will preferably be high compared to resistance 27.

The operation for FM reception is exactly the same as in Fig. 1. It will be observed that for AVC voltage the ratio detector acts as a voltage doubler, while this is not true for audio voltage. When the switches $S_1$ and $S_2$ are adjusted for AM signal reception, the switch $S_1$ will be shifted to contact 67, and switch $S_2$ has its arms 71 and 72 shifted to the respective AM contacts. In effect this removes circuits 50, 11 and 12 from the input to diodes 13 and 14, since the reactances of these circuits are low at the 456 kc. frequency of AM reception. Because of the fact that resistance 27 is much smaller than resistances 65 and 66 in series, the gain of the I. F. circuit for AM reception is greatly reduced when receiving FM signals.

Figure 5:
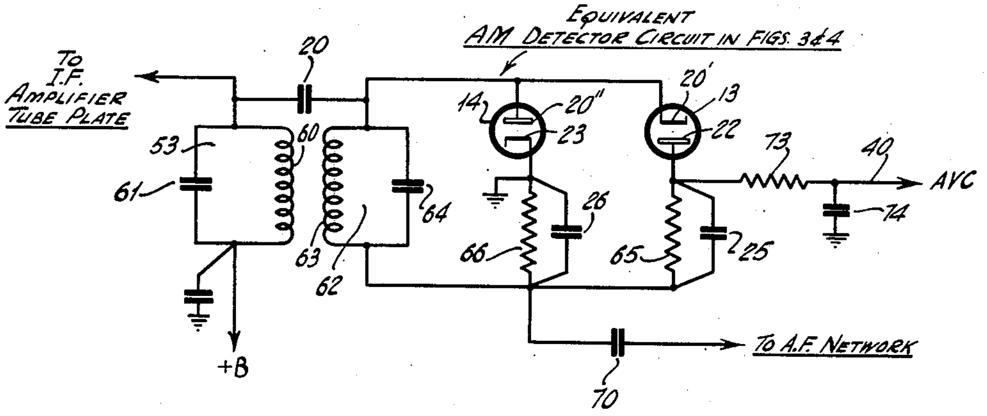
Fig. 5 shows the equivalent circuit diagram of the AM detector circuit in Figs. 3 and 4.

The equivalent circuit diagram in Fig. 5 shows the AM detector circuit resulting from adjusting switches $S_1$ and $S_2$ in Fig. 3 to the respective AM positions. As shown, the diodes 13 and 14 act as a voltage doubler AVC rectifier network, while for audio voltage the output of one rectifier is used. The input circuit effectively consists of circuits 53 and 62 coupled in cascade by condenser 20. Of course, if the capacity 20 were replaced by mutual inductance, then the latter would be the coupling reactance. Since resistor 27 and condenser 24 are out of the circuit on AM, they are not shown in Fig. 5.

If the audio voltage in Fig. 3 were taken from the upper end of resistor 65 so that the output of both diodes 13 and 14 were used, the circuit would be a voltage doubler for audio voltage in AM signal reception. Good design would provide the same audio output for a given setting of the volume control on both AM and FM reception. Hence, on AM reception it may be necessary to take even less than the audio from one tube. The AVC voltage may be too great, also, in either or both the AM and FM signal bands, and so the AVC may, also, be derived from a tap on the resistors 65, 66.

Figure 4:
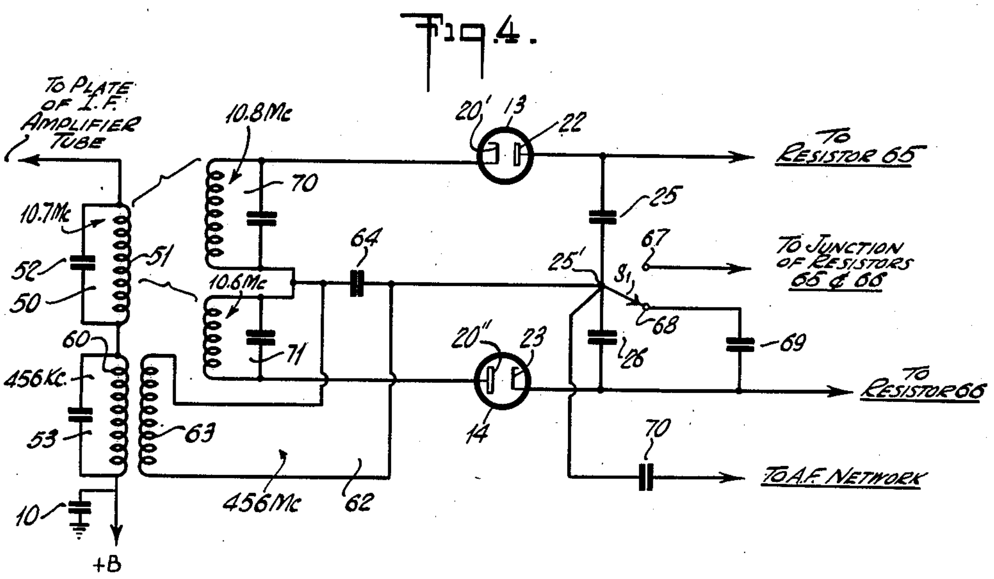
Fig. 4 is a further modification.

The circuit of Fig. 3 may be modified to the extent of having an FM discriminator input circuit of the so-called Conrad type. As shown in Fig. 4, the primary circuit 11 and secondary circuit 12 are replaced by the parallel resonant circuits 70 and 71. Thus, circuits 70 and 71 are respectively arranged in series with respective diodes 13 and 14. The resonant circuit 62, comprising coil 63 and shunt condenser 64, is arranged in series between the junction of circuits 70 and 71 and the junction 25' of condensers 25 and 26. Coil 51 is magnetically coupled to each of circuits 70 and 71, and the latter are respectively tuned to 10.8 mc. and 10.6 mc. In other words, the driver circuit 50 is coupled to oppositely mistuned resonant circuits 70, 71 in the manner shown in Conrad, U. S. Patent No. 2,057,640 of October 13, 1936. The AM circuits 53 and 62 are magnetically coupled at coils 60 and 63. For FM signal reception the Conrad discriminator input circuit functions to provide the amplitude-variable signal voltages for diodes 13 and 14. For AM signal reception the circuit effectively resolves itself into the equivalent AM detector circuit of Fig. 5.

While I have indicated and described several systems for carrying my invention into effect, it will be apparent to one skilled in the art that my invention is by no means limited to the particular circuit organizations shown and described, but that many modifications may be made without departing from the scope of my invention.

What I claim is:

1. In combination with a source of angle modulated carrier waves and a source of amplitude modulated carrier waves, an inductance element coupled to said sources, a frequency discriminator network responsive to said angle modulated carrier waves, a first capacitor coupling said inductance element to said network, a resistor, a pair of rectifiers connected to said network and in series with said resistor to provide a direct current path therethrough, a second and a third capacitor having a low impedance to said angle modulated carrier waves and connected across said resistor, the junction point of said second and third capacitor being connected through said network to said first capacitor, a modulation frequency output circuit coupled to said network, and a circuit including switch means for selectively deriving direct current voltage either from said resistor or from said output circuit and for selectively disconnecting said resistor from said rectifiers, said first and third capacitors having such a capacitance as to tune said inductance element to the frequency of said amplitude modulated carrier waves.

2. The combination with a source of angle modulated carrier waves and a source of amplitude modulated carrier waves, of an inductance element coupled to said source, a frequency discriminator network responsive to said angle modulated carrier waves, a first capacitor coupling said inductance element to said network, a resistor, a pair of rectifiers connected to said network and in series with said resistor to provide a direct current path therethrough, a second and a third capacitor having a low impedance to said angle modulated carrier waves and connected across said resistor, the junction point of said second and third capacitor being connected through said network to said first capacitor, a modulation frequency output circuit coupled to said junction point, a circuit including switch means for selectively deriving direct current voltage either from said resistor or from said output circuit, and further switch means for selectively disconnecting said resistor from said rectifiers, said first and third capacitors having such a capacitance as to tune said inductance element to the frequency of said amplitude modulated carrier waves.

3. In combination with a source of angle modulated carrier waves and a source of amplitude modulated carrier waves, a first inductance element coupled to said sources, a frequency discriminator network comprising a first parallel resonant circuit including a second inductance element, a second parallel resonant circuit including a third inductance element, said resonant circuits being tuned to the frequency of said angle modulated carrier waves, a first capacitor coupling said first element to said first resonant circuit, a conductive connection between intermediate points of said second and said third element, a resistor, a pair of rectifiers connected to said second resonant circuit and in series with said resistor to provide a direct current path therethrough, a second and a third capacitor having a low impedance to said angle modulated carrier waves and connected across said resistor, the junction point of said second and third capacitor being connected to said first resonant circuit, a modulation frequency output circuit coupled to said network, and a circuit including switch means for selectively deriving direct current voltage either from said resistor or from said output circuit and for selectively disconnecting said resistor from said rectifiers, said first and third capacitors having such a capacitance as to tune said first element to the frequency of said amplitude modulated carrier waves.

EARL I. ANDERSON.

REFERENCES CITED

The following references are of record in the file of this patent:

UNITED STATES PATENTS

| Number | Name | Date |
|---|---|---|
| 2,258,599 | Carlson | Oct. 14, 1941 |
| 2,382,015 | Lange | Aug. 14, 1945 |
| 2,413,913 | Duke | Jan. 7, 1947 |
| 2,413,977 | Koch | Jan. 7, 1947 |
| 2,429,762 | Koch | Oct. 28, 1947 |